United States Patent
Heirich

(10) Patent No.: US 9,223,551 B1
(45) Date of Patent: Dec. 29, 2015

(54) RENDERGRAPH COMPILATION METHOD AND USE THEREOF FOR LOW-LATENCY EXECUTION

(71) Applicant: HERE Global B.V., Veldhoven (NL)

(72) Inventor: Alan Bryant Heirich, Half Moon Bay, CA (US)

(73) Assignee: HERE GLOBAL B.V., Veldhoven (NL)

( * ) Notice: Subject to any disclaimer, the term of this patent is extended or adjusted under 35 U.S.C. 154(b) by 0 days.

(21) Appl. No.: 14/337,855

(22) Filed: Jul. 22, 2014

(51) Int. Cl.
*G06F 9/45* (2006.01)
*G06T 15/00* (2011.01)
*G06T 11/20* (2006.01)

(52) U.S. Cl.
CPC .............. *G06F 8/41* (2013.01); *G06T 15/005* (2013.01); *G06T 11/206* (2013.01)

(58) Field of Classification Search
CPC .................. G06F 8/41–8/4441; G06T 15/005
USPC ................... 717/144; 345/440, 501; 382/113
See application file for complete search history.

(56) References Cited

U.S. PATENT DOCUMENTS

| | | | | |
|---|---|---|---|---|
| 6,400,849 | B1 | 6/2002 | Lee et al. | 382/260 |
| 7,100,164 | B1 * | 8/2006 | Edwards | 718/108 |
| 7,530,062 | B2 * | 5/2009 | Aronson et al. | 717/159 |
| 8,010,944 | B1 * | 8/2011 | Kilgard et al. | 717/116 |
| 8,203,558 | B2 * | 6/2012 | Abbas | 345/426 |
| 8,368,705 | B2 * | 2/2013 | Green et al. | 345/522 |
| 8,448,156 | B2 | 5/2013 | Demetriou et al. | 717/149 |
| 8,553,040 | B2 * | 10/2013 | Sevigny et al. | 345/502 |
| 8,689,199 | B2 * | 4/2014 | Aronson et al. | 717/159 |
| 8,723,875 | B2 * | 5/2014 | Green et al. | 345/522 |
| 8,791,959 | B2 * | 7/2014 | Yamaguchi | 345/629 |
| 8,970,596 | B2 * | 3/2015 | Murthy et al. | 345/440 |
| 8,970,613 | B2 * | 3/2015 | Murthy et al. | 345/557 |
| 9,019,292 | B2 * | 4/2015 | Bloomfield et al. | 345/552 |
| 9,027,007 | B2 * | 5/2015 | Brackman et al. | 717/151 |
| 9,104,432 | B2 * | 8/2015 | Auerbach et al. | 1/1 |

(Continued)

FOREIGN PATENT DOCUMENTS

EP 2 364 029 A2 9/2011

OTHER PUBLICATIONS

A Shader Framework for Rapid Prototyping of GPU-Based Volume Rendering—Christian Rieder, Horst K. Hahn—Fraunhofer MEVIS, Germany; Stephan Palmer, Florian Link—MeVis Medical Solutions AG, Germany—Eurographics / IEEE Symposium on Visualization 2011.*

(Continued)

*Primary Examiner* — Jason Mitchell
*Assistant Examiner* — Francisco Aponte
(74) *Attorney, Agent, or Firm* — Harrington & Smith

(57) ABSTRACT

A graph is compiled that defines a data flow from input(s) to output(s) for images. The data flow includes one or more filters to be applied to the images. Compiling the graph includes forming an assemblage of kernel invocations for the data flow and forming a mapping between kernel invocations in code for the one or more filters and the assemblage of kernel invocations. For multiple ones of a number of frames of images, code in the one or more filters is executed, data is passed into the assemblage to indicate which execution path in the assemblage should be chosen from among a plurality of possible execution paths for one of the filters, wherein the data is determined using at least the mapping and the executing code, and kernel invocations in the indicated execution path are executed. Methods, apparatus, and computer program products are disclosed.

16 Claims, 10 Drawing Sheets

(56) References Cited

U.S. PATENT DOCUMENTS

| | | | | |
|---|---|---|---|---|
| 2002/0162097 | A1* | 10/2002 | Meribout | 717/155 |
| 2004/0017403 | A1* | 1/2004 | Andersson et al. | 345/848 |
| 2004/0034795 | A1* | 2/2004 | Anderson et al. | 713/201 |
| 2005/0140672 | A1* | 6/2005 | Hubbell | 345/426 |
| 2006/0274070 | A1* | 12/2006 | Herman et al. | 345/474 |
| 2007/0018980 | A1* | 1/2007 | Berteig et al. | 345/426 |
| 2008/0052687 | A1* | 2/2008 | Gonzales-Tuchmann et al. | 717/140 |
| 2010/0214301 | A1* | 8/2010 | Li et al. | 345/522 |
| 2010/0214313 | A1* | 8/2010 | Herman et al. | 345/593 |
| 2010/0328325 | A1* | 12/2010 | Sevigny et al. | 345/522 |
| 2010/0328326 | A1* | 12/2010 | Hervas et al. | 345/522 |
| 2010/0328327 | A1* | 12/2010 | Hervas et al. | 345/522 |
| 2010/0329564 | A1* | 12/2010 | Hervas et al. | 382/190 |
| 2012/0284701 | A1* | 11/2012 | Tsai et al. | 717/151 |
| 2013/0063472 | A1* | 3/2013 | Marison et al. | 345/591 |
| 2013/0328898 | A1 | 12/2013 | Murthy et al. | 345/557 |
| 2014/0165049 | A1* | 6/2014 | Diamos et al. | 717/156 |
| 2014/0258997 | A1* | 9/2014 | Lim et al. | 717/151 |
| 2014/0306975 | A1* | 10/2014 | Hervas et al. | 345/522 |
| 2014/0347371 | A1* | 11/2014 | Stenson et al. | 345/501 |
| 2014/0347375 | A1* | 11/2014 | Stenson et al. | 345/522 |
| 2014/0368516 | A1* | 12/2014 | Taggart et al. | 345/505 |
| 2015/0066927 | A1* | 3/2015 | Goyal et al. | 707/737 |

OTHER PUBLICATIONS

"Faster spatial image processing using partial summation", Hodges, Steve, et al., Cambridge University Engineering Department, Technical Report (TR.245), Jan. 1996, 44 pgs.

"Adaptive Frameless Rendering", Abhinav Dayal, et al., Eurographics Symposium on Rendering, 2005, 11 pgs.

"The Render Graph: A Data Structure to Aid in the Interactive Display of Scene Graph Data", Hofmann, Jonathan Scott, Thesis, Jan. 31, 2003, 49 pgs.

* cited by examiner

```
//
// HighlightShadow.cpp
// imageframework
// include "HighlightShadow.h"

include "Context.h"

using namespace IF;

bool HighlightShadow::execute(){
    unsigned index = (getHighlight() > 0.0) << 1 | (getShadow() > 0.0);
    switch(index){
        case 1: __ScheduleKernel__("shadow", getShadow()); break;
        case 2: __ScheduleKernel__("highlight", getHighlight()); break;
        case 3: __ScheduleKernel__("highlightShadow", getHighlight(), getShadow()); break;
        default: break;
    }//switch
    return true;
}
```

FIG. 4B

RENDERGRAPH COMPILATION METHOD AND USE THEREOF FOR LOW-LATENCY EXECUTION

TECHNICAL FIELD

Various embodiments relate generally to the field of image processing and in particular to software frameworks that support image processing operations.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Some operating systems have an abstraction layer that hides the complexity of graphics hardware from those exploiting that hardware. These abstraction layers may use various constructs to make programming easier. A render graph (referred to herein as a RenderGraph) is a data structure designed to aid in the computation of image processing operations. It is a graph structure whose nodes, called render actions, each represent one operation executed by the underlying graphics library. These actions are executed by traversing the graph, producing the contents of the frame buffer that is then displayed to the user.

In order to be performant when miming on a GPU (Graphics Processing Unit), the RenderGraph is typically compiled into a single GPU shader. Such a GPU shader may be called an uberKernel. A RenderGraph may also be compiled to run on a CPU, and in this case the uberKernel is a CPU shader or CPU code. In the instant context, the term uberKernel means, e.g., an assemblage of kernel invocations, where "uber" means "over" as this is the controlling code that calls other code. With regard to a GPU shader example, the uberKernel contains kernel code to invoke the image processing filters that the RenderGraph invokes from the framework.

A difficulty arises because the execution sequence within the uberKernel can change from frame to frame as a result of changes to, e.g., image filter parameters. For a concrete example, consider a HighlightAndShadow filter that reduces shadows and increases highlights. This filter takes two parameters, shadows and highlights, with values from 0.0 to 1.0. Depending on the values of these parameters, two (both shadows and highlights), one (either shadows or highlights) or zero (neither shadows nor highlights) invocations of filter processing kernels may be invoked by the RenderGraph. As a result, the uberKernel may need to invoke different kernel code on different frames. A problem that needs to be solved is how to allow different uberKernel control flow on different frames without burdening the runtime execution with unacceptable overhead.

BRIEF SUMMARY

This summary is merely exemplary and is not intended to be limiting.

An exemplary embodiment is a method, comprising: compiling a graph that defines a data flow from one or more inputs to one or more outputs for images, wherein the data flow includes one or more filters to be applied to the images, and wherein compiling the graph comprises forming an assemblage of kernel invocations for the data flow and forming a mapping between kernel invocations in code for the one or more filters and the assemblage of kernel invocations; and for multiple ones of a plurality of frames of images, executing code in the one or more filters, passing data into the assemblage to indicate which execution path in the assemblage should be chosen from among a plurality of possible execution paths for one of the filters, wherein the data is determined using at least the mapping and the executing code, and executing kernel invocations in the indicated execution path.

An exemplary apparatus includes one or more processors and one or more memories including computer program code. The one or more memories and the computer program code are configured to, with the one or more processors, cause the apparatus to perform at least the following: compiling a graph that defines a data flow from one or more inputs to one or more outputs for images, wherein the data flow includes one or more filters to be applied to the images, and wherein compiling the graph comprises forming an assemblage of kernel invocations for the data flow and forming a mapping between kernel invocations in code for the one or more filters and the assemblage of kernel invocations; and for multiple ones of a plurality of frames of images, executing code in the one or more filters, passing data into the assemblage to indicate which execution path in the assemblage should be chosen from among a plurality of possible execution paths for one of the filters, wherein the data is determined using at least the mapping and the executing code, and executing kernel invocations in the indicated execution path.

An exemplary computer program product includes a computer-readable storage medium bearing computer program code embodied therein for use with a computer. The computer program code includes: code for compiling a graph that defines a data flow from one or more inputs to one or more outputs for images, wherein the data flow includes one or more filters to be applied to the images, and wherein compiling the graph comprises forming an assemblage of kernel invocations for the data flow and forming a mapping between kernel invocations in code for the one or more filters and the assemblage of kernel invocations; and code, for multiple ones of a plurality of frames of images, for executing code in the one or more filters, for passing data into the assemblage to indicate which execution path in the assemblage should be chosen from among a plurality of possible execution paths for one of the filters, wherein the data is determined using at least the mapping and the executing code, and for executing kernel invocations in the indicated execution path.

A further exemplary embodiment is an apparatus, comprising: means for compiling a graph that defines a data flow from one or more inputs to one or more outputs for images, wherein the data flow includes one or more filters to be applied to the images, and wherein the means for compiling the graph comprises means for forming an assemblage of kernel invocations for the data flow and means for forming a mapping between kernel invocations in code for the one or more filters and the assemblage of kernel invocations; and means for executing code in the one or more filters, means for passing data into the assemblage to indicate which execution path in the assemblage should be chosen from among a plurality of possible execution paths for one of the filters, wherein the data is determined using at least the mapping and the executing code, and means for executing kernel invocations in the indicated execution path, wherein the means for executing code, means for passing data, and means for executing kernel invocations are used for multiple ones of a plurality of frames of images.

BRIEF DESCRIPTION OF THE DRAWINGS

The foregoing and other aspects of embodiments of this invention are made more evident in the following Detailed Description of Exemplary Embodiments, when read in conjunction with the attached Drawing Figures, wherein:

FIG. 4B shows filter code for the highlight shadow filter of FIG. 4;

DETAILED DESCRIPTION OF THE DRAWINGS

For ease of reference, the present disclosure is divided into sections.

1. Exemplary Apparatus

Figure 1:
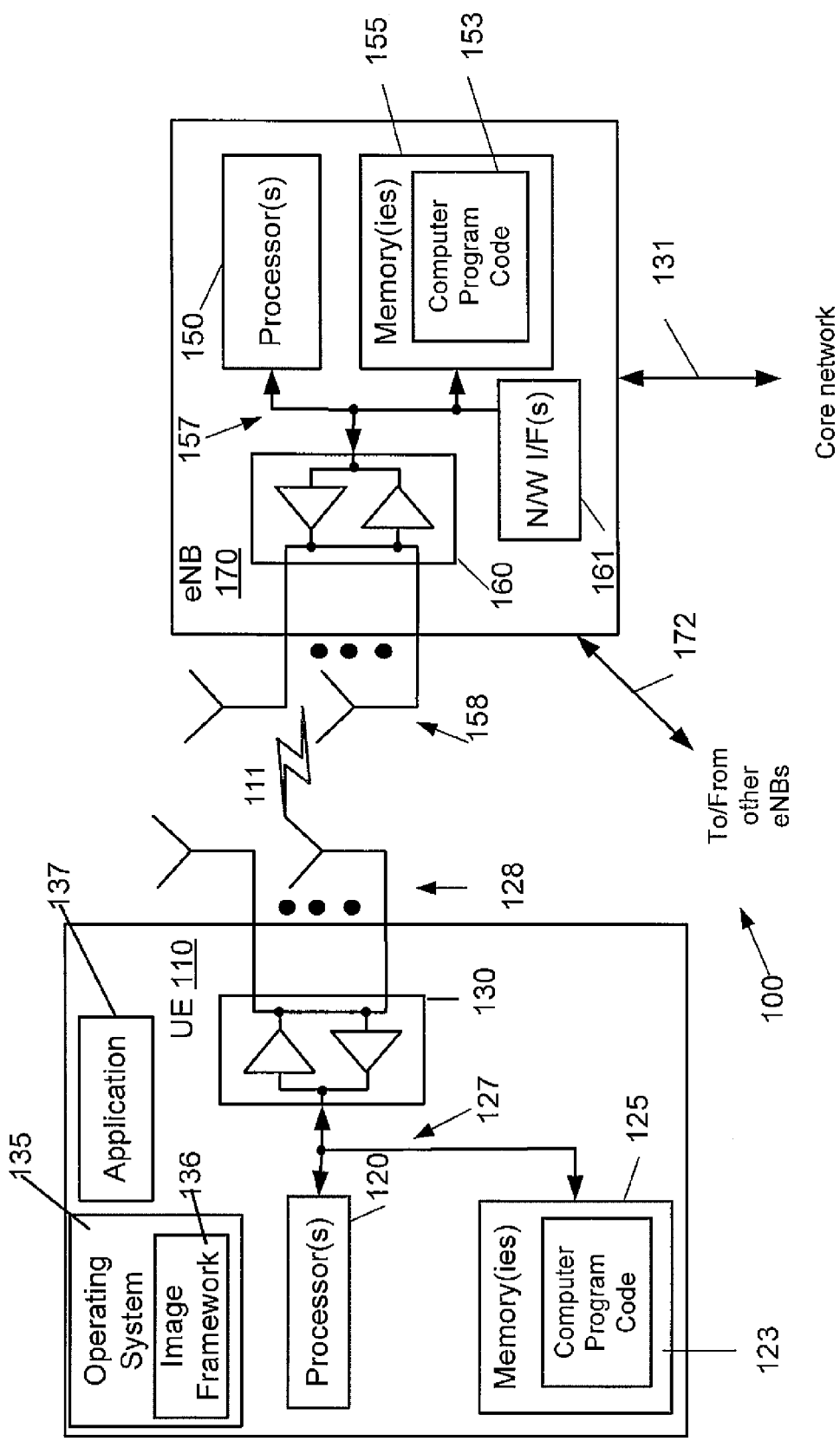
FIG. 1 is a block diagram of an exemplary system in which the exemplary embodiments may be practiced.

Before proceeding with additional description of problems with conventional systems, reference is made to FIG. 1, which shows a block diagram of an exemplary system in which the exemplary embodiments may be practiced. In FIG. 1, a UE 110 is in wireless communication with a network 100. The user equipment 110 includes one or more processors 120, one or more memories 125, and one or more transceivers 130 interconnected through one or more buses 127. The one or more transceivers 130 are connected to one or more antennas 128. The one or more memories 125 include computer program code 123. The UE 110 communicates with eNB 170 via a wireless link 111.

The UE also includes an operating system 135. As part of the operating system 135, an image framework 136 is included, and this image framework 136 may be considered to implement the exemplary embodiments herein. The image framework 136 can be separate from the operating system 135, but typically is not. In an exemplary embodiment, the one or more memories 125 and the computer program code 123 are configured to, with the one or more processors 120, cause the user equipment 110 to perform one or more of the operations as described herein. For instance, the operating system 135 and the image framework 136 would be computer program code 123 and the one or more processors 120 would execute portions of these in order to perform operations as described herein. In another exemplary embodiment, the image framework 136 (e.g., and the operating system 135) may be implemented by hardware such as an integrated circuit or a programmable gate array. Additionally, the exemplary embodiments can be implemented in part by using computer program code 123 (executed by a hardware processor 120) and in part through hardware.

Figure 2:
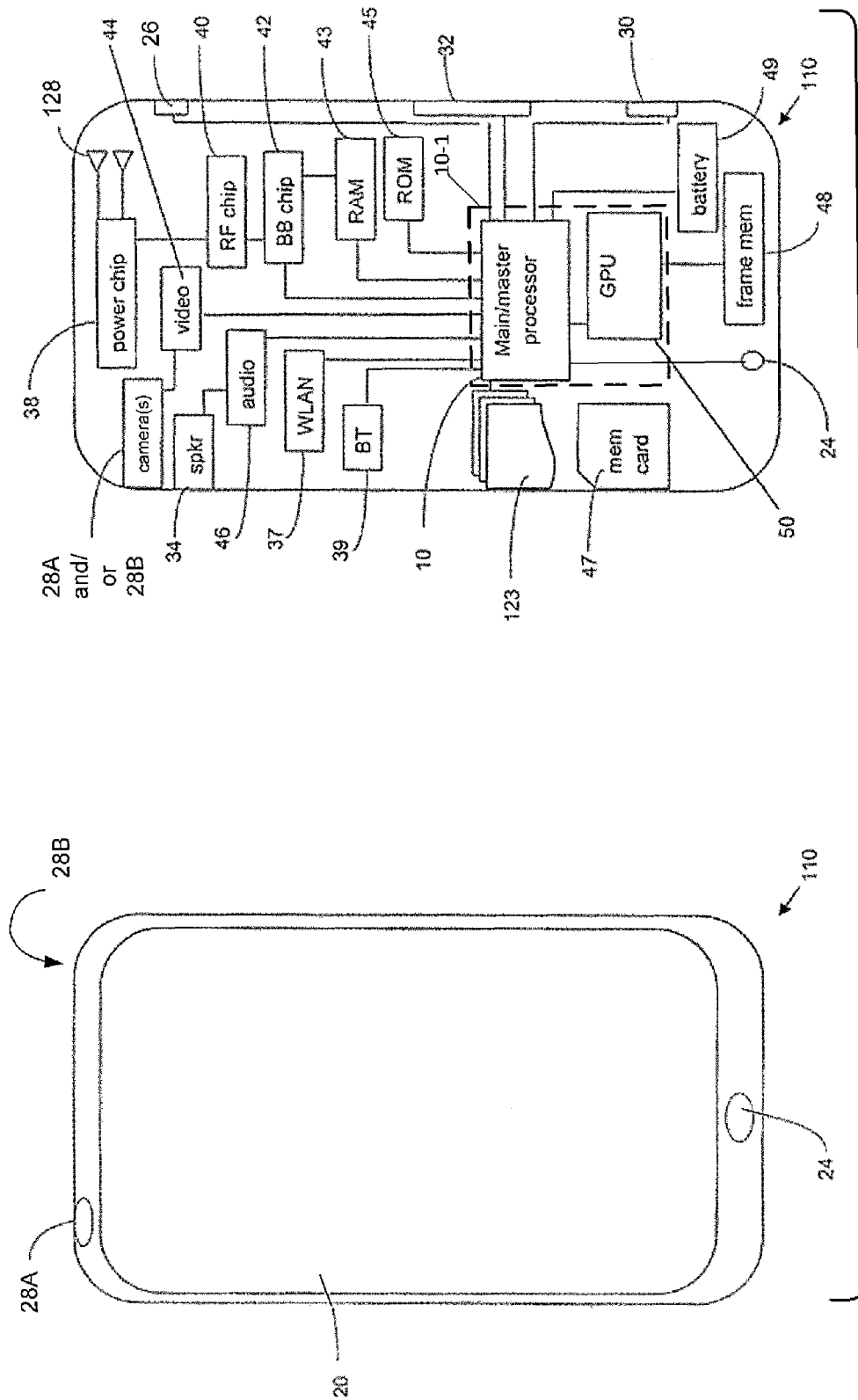
FIG. 2 shows a more particularized block diagram of an exemplary user equipment such as that shown in FIG. 1.

An application 137 is also shown in the UE 110. The application uses the image framework 136 in order to cause the UE 110 to display images on a display. A display is shown in FIG. 2.

The eNB 170 includes one or more processors 150, one or more memories 155, one or more network interfaces (N/W I/F(s)) 161, and one or more transceivers 160 interconnected through one or more buses 157. The one or more transceivers 160 are connected to one or more antennas 158. The one or more memories 155 include computer program code 153. The one or more memories 155 and the computer program code 153 are configured to, with the one or more processors 150, cause a corresponding one of the eNBs 170 to perform one or more of the operations as described herein. The one or more network interfaces 161 communicate over a network such as by using the interfaces 172 and 131. Two or more eNBs 170 communicate using, e.g., interface 172. The interface 172 may be wired or wireless or both and may implement, e.g., an X2 interface. The eNB 170 may communicate with a core network via the interface 131.

The computer readable memories 125 and 155 may be of any type suitable to the local technical environment and may be implemented using any suitable data storage technology, such as semiconductor based memory devices, flash memory, magnetic memory devices and systems, optical memory devices and systems, fixed memory and removable memory. The processors 120 and 150 may be of any type suitable to the local technical environment, and may include one or more of general purpose computers, special purpose computers, microprocessors, digital signal processors (DSPs) and processors based on a multi-core processor architecture, as non-limiting examples.

In general, the various embodiments of the user equipment 110 can include, but are not limited to, cellular telephones such as smart phones, tablets, computers, personal digital assistants (PDAs), portable computers, image capture devices such as digital cameras, gaming devices, music storage and playback appliances, Internet appliances permitting wireless Internet access and browsing, as well as portable units or terminals that incorporate combinations of such functions. Basically, the user equipment 110 may be any electronic device that displays images. Additionally, although the user equipment 110 is shown operating wirelessly, the user equipment 110 may operate using a wired network or with no network.

FIG. 2 illustrates further detail of an exemplary UE 110 in both plan view (left) and sectional view (right). As shown in FIG. 2, the UE 110 includes a graphical display interface (e.g., touchscreen) 20 and a user interface that comprises a microphone 24 and speaker(s) 34 and touch-screen technology at the graphical display interface 20 and/or voice-recognition technology for audio signals received at the microphone 24. A power actuator 26 controls the UE 110 being turned on and/or off by the user. The UE 110 may include a camera 28A, which is shown as forward facing (e.g., for video calls) but may alternatively or additionally be rearward facing 28B (e.g., for capturing images and video for local storage). The camera(s) 28A and 28B (called camera(s) 28 collectively) may be controlled by a shutter actuator 30 and optionally by a zoom actuator 32, which may alternatively function as a volume adjustment for the speaker(s) 34 when the camera 28 is not in an active mode. These actuators may also be implemented using touch-screen technology.

Within the sectional view of FIG. 2 are seen multiple transmit/receive antennas 128 that are typically used for wireless communication (e.g., cellular communication). The antennas 128 may be multi-band for use with other radios in the UE. The operable ground plane for the antennas 128 may span the entire space enclosed by the UE housing, though in some embodiments the ground plane may be limited to a smaller area, such as disposed on a printed wiring board on which a power chip 38 is formed. The power chip 38 controls power amplification on the channels being transmitted on and/or across the antennas that transmit simultaneously, where spatial diversity is used, and amplifies received signals. The power chip 38 outputs the amplified received signal to the radio frequency (RF) chip 40, which demodulates and down-converts the signal for baseband processing. The baseband (BB) chip 42 detects the signal, which is then converted to a bit-stream and finally decoded. Similar processing occurs in reverse for signals generated in the UE 110 and transmitted from the UE.

Signals to and from the camera(s) 28 pass through an image/video processor (video) 44, which encodes and decodes the image data (e.g., image frames). A separate audio processor 46 may also be present to control signals to and from the speakers (spkr) 34 and the microphone 24. The graphical display interface 20 is refreshed from a frame memory (frame mem) 48 as controlled by a user GFU 50, which may process signals to and from the display interface 20.

Certain exemplary embodiments of the UE 110 may also include one or more secondary radios such as a wireless local area network radio (WLAN) 37 and/or a Bluetooth radio (BT) 39, which may incorporate one or more on-chip antennas or be coupled to one or more off-chip antennas. Throughout the UE 110 are various memories 125, such as a random access memory (RAM) 43, a read only memory (ROM) 45, and, in some exemplary embodiments, a removable memory such as the illustrated memory card 47. In some exemplary embodiments, various programs (as computer program code 123) are stored on the memory card 47. The components within the UE 110 may be powered by a portable power supply such as a battery 49.

The aforesaid processors 10, 38, 40, 42, 44, 46, and 50 are examples of processors 120. If such processors 38, 40, 42, 44, 46, and 50 are embodied as separate entities in the UE 110, these may operate in a master-slave relationship with respect to the main/master processor 10. Exemplary embodiments need not be disposed in a central location, but may instead be disposed across various chips and memories as shown or disposed within another processor that combines some of the functions described above for FIG. 2. Any or all of these various processors of FIG. 2 may access one or more of the various memories, which may be on-chip with the processor or separate therefrom.

Note that the various processors (e.g., 38, 40, 42, etc.) described above may be combined into a fewer number of such processors and/or chips and, in a most compact case, may be embodied physically within a single processor or chip. For instance, the main/master processor 10 and the GPU 50 may be a single unit (i.e., on one piece of silicon), as illustrated by processor 10-1.

2. Additional Description of Problems with Conventional Systems

As noted above a problem that needs to be solved is how to allow different single GPU shaders (called "uberKernels") on different image frames without burdening the runtime execution with unacceptable overhead. The least performant solution to this problem is to assume that the uberKernel must be completely regenerated on every frame. The result of this choice has been that a system implementing this choice is relatively slow. U.S. patent Ser. No. 13/533,364 "Render Tree Caching", U.S. Publication No. 2013/0328898 improves upon this by, e.g., the following (see the Abstract):

"GPU fragment programs can be used to render images in a computer system. These fragment programs are generated from render trees, which specify one or more filters or functions to be applied to an input image to render an output image. It is not uncommon for successive frames to require application of substantially the same filters. Therefore, rather than regenerate and recompile new fragment programs for successive corresponding render trees, the render trees are substantially uniquely identified and cached. Thus, when a render tree is received, it can be identified, and this identifier (such as a hash) can be used to determine whether a corresponding fragment program has already been generated, compiled and cached. If so, the corresponding cached fragment program is retrieved and executed. If not, a fragment program for the newly received render tree is generated and cached."

The U.S. patent Ser. No. 13/533,364 had to perform compilation every frame for a fragment program, and an idea of U.S. patent Ser. No. 13/533,364 was to use previously compiled and stored fragment programs of render graphs for individual frames instead of recompiling the fragment programs.

By contrast, for the instant disclosure, a render graph is compiled once and then used for multiple frames. As described above, the RenderGraph is typically compiled into a single GPU or CPU kernel that is called the uberKernel herein. The uberKernel used for multiple frames, but the RenderGraph is only compiled once.

3. Overview

Turning to the exemplary embodiments herein, broadly exemplary embodiments include an algorithm to pre-generate all of the possible uberKernel execution sequences in a compact way, combined with an efficient mechanism to match each frame to its corresponding execution sequence. In an exemplary embodiment, the pre-generation step occurs at the time the RenderGraph is compiled prior to execution. It is shown that this can be done without an unreasonable increase in code size. At execution time, the only overhead is the cost of associating the current sequence of kernel invocations with the corresponding execution sequence. This is an O(n) operation with a solution based on hashing, and finite state automata (FSA).

Figure 3:
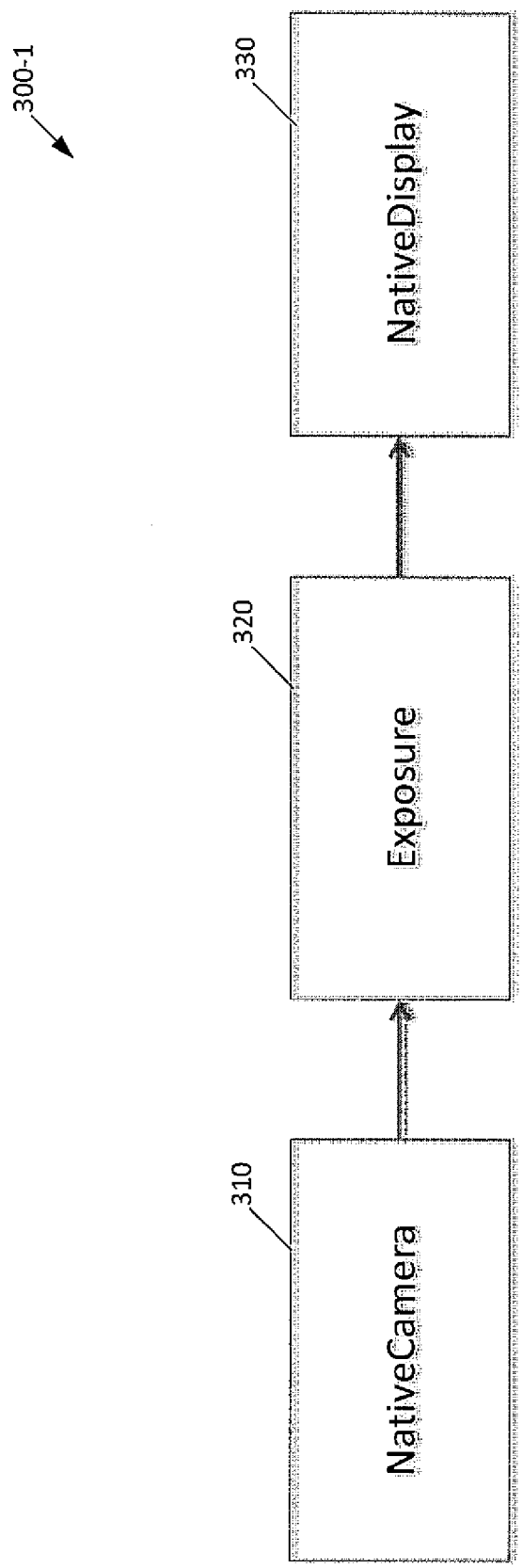
FIG. 3 illustrates a simple example of a RenderGraph.

In more detail, the context of various embodiments is a framework for image processing operations. A developer defines a RenderGraph that defines a data flow from inputs to outputs. At each node of the RenderGraph, a filter is applied to the inputs to produce the outputs. FIG. 3 illustrates a simple example of a RenderGraph 300-1 with an image source 310 (NativeCamera) providing images to an Exposure filter 320 that provides images to an image sink 330 (NativeDisplay). RenderGraph 300-1 is one example of a RenderGraph 300, and additional examples of these graphs are described below.

OpenCL is used as an example herein. OpenCL (Open Computing Language) is a standard for cross-platform, parallel programming of modern processors found in personal computers, servers and handheld/embedded devices. More generally, OpenCL is a framework for writing programs that execute across heterogeneous platforms including central processing units (CPUs), graphics processing units (GPUs), digital signal processors (DSPs), field-programmable gate arrays (FPGAs) and other processors. OpenCL includes a language for writing kernels (functions that execute on OpenCL devices), plus application programming interfaces (APIs) that are used to define and then control the platforms.

In OpenCL, the requirements for a filter are as follows:
An image-valued function of one or more source images and filter parameters;
A host-side execute( ) method in C++ that schedules OpenCL functions for subsequent execution;
CPU- or GPU-side OpenCL functions compute the filter; unction parameters may be uniforms, pixels or images; and/or
Host-side methods include: execute, getParameters, getColorSpace, get/set parameters, num Inputs/Outputs, domainOfDefinition, regionOfInterest.

Figure 4A:
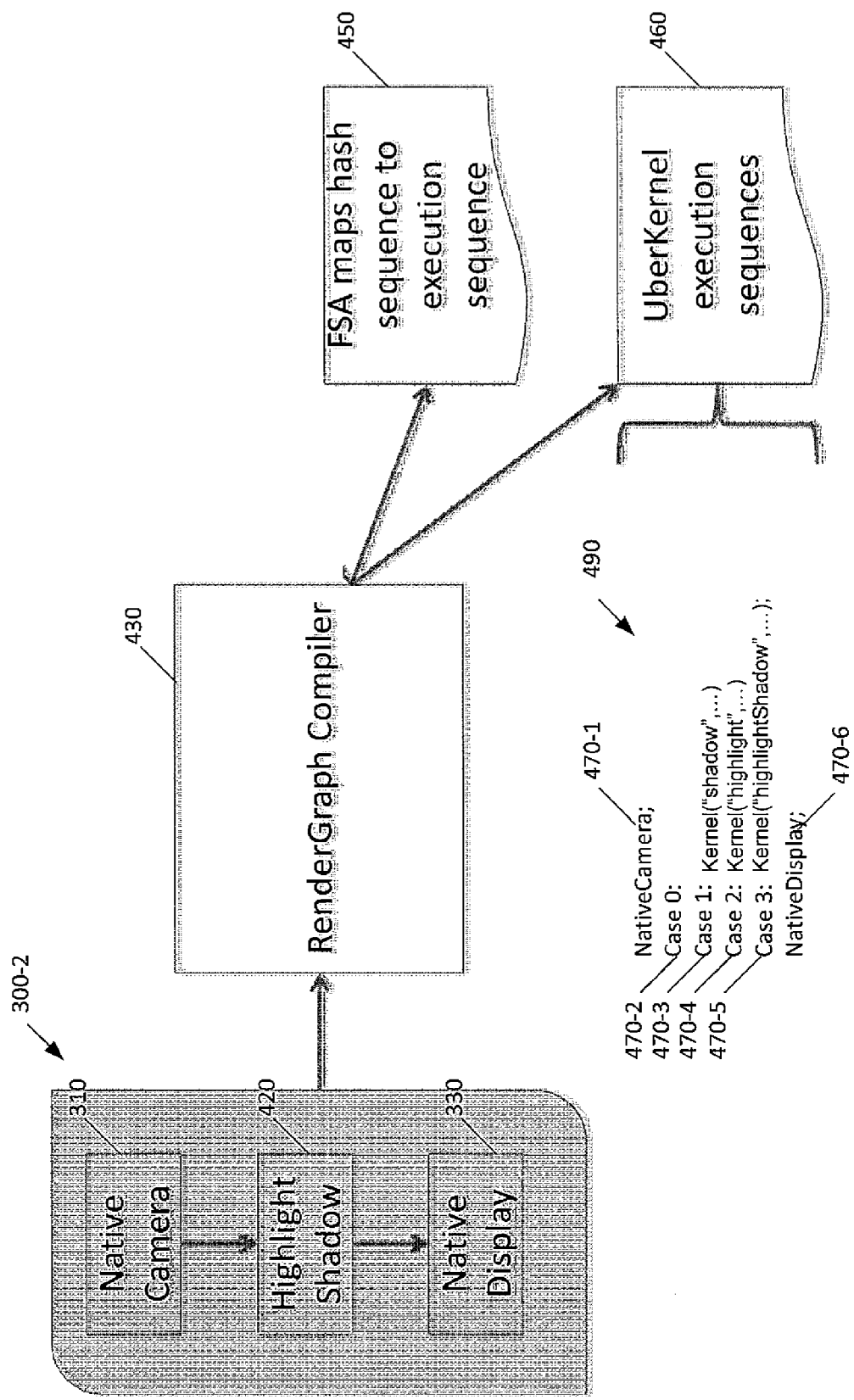
FIG. 4A shows a RenderGraph compiler processing a more complex filter that generates multiple execution sequences and includes a finite state automaton (FSA)

FIG. 4A shows a RenderGraph compiler 430 processing a more complex filter, a highlight shadow filter 420, that generates multiple execution sequences. Code 440 for the highlight shadow filter 420 is shown in FIG. 4B. The code 440 has a file name HighlightShadow.cpp (where ".cpp" is an extension for a C++ program, although the exemplary embodiments are not limited to any language). This program conditionally invokes (via the "switch(index)" statement) one of three possible kernel functions depending on the values of the parameters getHighlight( ) and getShadow( ). The kernel functions are shown in part as "_ScheduleKernel". The variable "index" will be assigned the value of one (if getShadow( ) is greater than 0.0), two (if getHightlight( ) is greater than zero; note that this Boolean result is shifted left by one bit), and three (if both getShadow( ) and getHightlight( ) are greater then 0.0).

This example is a useful illustration to illustrate many of the concepts used herein and is easy to understand. The program has simple flow control, limited to either invoking or not invoking any of a list of kernel functions. In this example, the host-side code 440 will only invoke one kernel function from the three possibilities, but in general there could be any number of invocations of kernel functions in a single host-side function.

The developer compiles the RenderGraph 300-2 before the RenderGraph 300-2 is executed. As previously described, the term RenderGraph refers to an entire data structure in host memory that defines the complete rendering operation. The RenderGraph is in the form of a DAG (Directed Acyclic Graph) with a filter associated with each node of the DAG. The RenderGraph is used during RenderGraph compilation and RenderGraph execution stages. The developer can invoke code (e.g., via application 137) to cause the compilation. The RenderGraph 300-2 in this example has the image source, NativeCamera 310, and image sink, NativeDisplay 330, from FIG. 3. However, the filter is HighlightShadow 420 filter that can perform highlighting, shadowing, or both highlighting and shadowing. A RenderGraph compiler 430 processes a RenderGraph 300 (300-2 in the example of FIG. 4A) to produce an uberKernel 460 and an associated FSA 450. The uberKernel 460 includes execution sequences 490. The FSA 450 is used to map a runtime sequence of kernel invocations to a single execution sequence in the uberKernel. Furthermore, the FSA 450 may map a hash sequence to an execution sequence as described below.

The exemplary execution sequences 490 in this example include the following statements 470:

NativeCamera 470-1;
Case 0: 470-2;
Case 1: Kernel("highlight", . . . ) 470-3;
Case 1: Kernel("shadow", . . . ) 470-4;
Case 1: Kernel("highlightShadow", . . . );
NativeDisplay 470-6.

The RenderGraph compiler 430 uses the host-side filter code 440, which is written by the filter designer and compiled as part of the filter compilation process. The filter compilation process is described in more detail below. The code 440 allows the compiler 430 to determine the different cases in statements 470-2, 470-3, 470-4, and 470-5. In particular, the statements 470-2 through 470-5 correspond with the statements in the switch selection statement as follows: Statement 470-2 of Case 0 corresponds to the default statement in the switch selection statement; statement 470-3 of Case 1 corresponds to case 1 of the switch selection statement; statement 470-4 of Case 2 corresponds to case 2 of the switch selection statement; and statement 470-5 of Case 3 corresponds to case 3 of the switch selection statement.

The example of FIG. 4A illustrates that a single filter may generate multiple execution sequences. At runtime on each frame, the image framework 136 selects one of these execution sequences. In order to support this, the compiler 430 generates in one embodiment an FSA 450 that maps hash-encoded kernel sequences in the code 440 to execution sequences 490 in the uberKernel. The compiler may rewrite the host-side filter code so that kernel invocations use hashed values of kernel names. This allows efficient matching of kernel names without the overhead of string processing.

When the RenderGraph 300-2 executes, the operations performed for each frame include a host-side filter execution followed by an uberKernel invocation. The host side code 440 contains calls to function "_ScheduleKernel_( )" that takes as its first argument the name of a kernel function to be schedule, followed by arguments to that kernel function. The name is a string but may be encoded internally as a hash function of the name Within _ScheduleKernel_( ) the kernel function arguments are marshaled for the call to the uberKernel, and the (hashed) kernel name is used to advance the state of the FSA 450. When the FSA 450 reaches an accepting state, the value of a single execution sequence is known, as identified by the id of the accepting state. Once this is known, the uberKernel can be invoked with the specific execution sequence identified by passing the accepting state id (identification) as an argument.

Figure 4C:
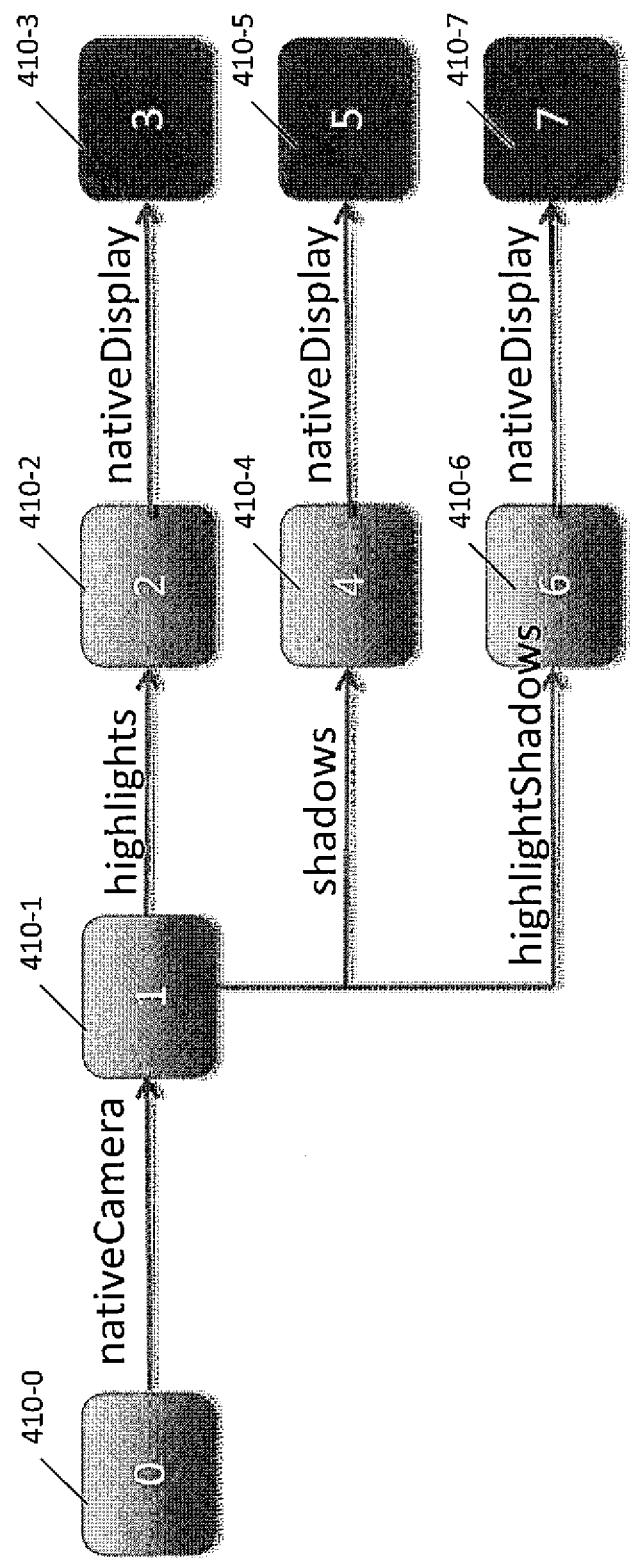
FIG. 4C is a state-transition diagram for the FSA in FIG. 4A.

Referring to FIG. 4C, this figure is a state-transition diagram for the FSA 450 in FIG. 4A. The diagram is FIG. 4C may be encoded as a table that is read by the FSA 450. The table is generated by the RenderGraph compiler 430. The states 410 include states 410-0 and 410-1, the transition between which is caused by nativeCamera. From state 410-1, there are three transitions, caused by highlights, shadows or highlightShadows, to states 410-2, 410-4, or 410-6, respectively. From states 410-2, 410-4, or 410-6 there are three corresponding transitions caused by nativeDisplay to the states 410-3, 410-5, or 410-7, respectively.

Figure 4D:
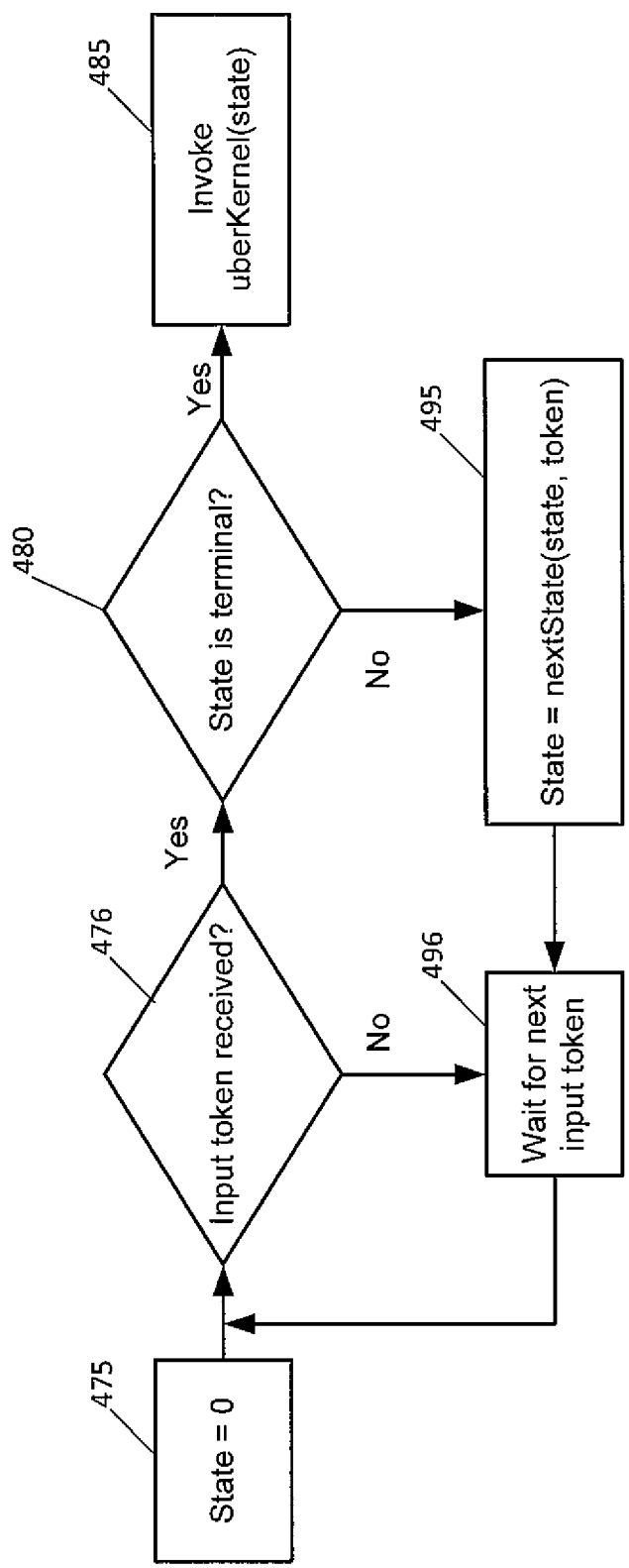
FIG. 4D is a finite state automation flowchart for the FSA in FIG. 4A.

FIG. 4D is a finite state automation flowchart for the FSA 450 in FIG. 4A. The initial state is state 0 410-0, as indicated by reference 475. In block 476, the FSA determines whether an input token has been received. Input tokens are received by execution of the code 440, and more specifically by a rewritten version of the code 440 that uses hashed values of kernel names. If an input token has not been received (block 496=No), in block 496, the FSA waits for the next input token. Blocks 476 and 496 are performed until an input token is received. The FSA 450 receives (block 476=Yes) an input token (e.g., the hash encoded representation of "highlights") and changes its state based on the value of the input token. If the FSA 450 reaches a terminal state (states 3 410-3, 5 410-5, or 7 410-7 in this example) (block 480=Yes), the FSA 450 invokes (block 485) the uberKernel and passes into the uberKernel the value of the terminal state. This allows conditional code inside the uberKernel to decide where to invoke kernels based on this state. If the state is not terminal (block 480=No), the flow proceeds to block 495, where the current state ("State") is set to the next state using a current value of a state ("state") and the input token ("token"), e.g., State=nextState(state, token).

Note that in many cases there will be a single execution sequence and so this mechanism can be disabled, resulting in code that runs as fast as hand-written code. For a simple example, suppose there is a single conditional statement in the host side code 440 that needs to be supported in the uberKernel. This support can be implemented by setting a Boolean variable in the host side code 440 and passing that into the uberKernel. Extend this to any number of conditional statements by creating an array of Boolean variables. Further compact this array by converting the array into a bit stream, since only one bit is needed per variable.

For instance, an alternative embodiment uses a conditional bit stream in place of an FSA. See FIG. 5. In this embodiment, successive bits in the bit stream are set to indicate whether specific invocations of _ScheduleKernel_ are executed within execute( ). The bit stream is passed into the uberKernel where the code examines the bit stream to conditionally invoke the specified kernels.

Figure 5:
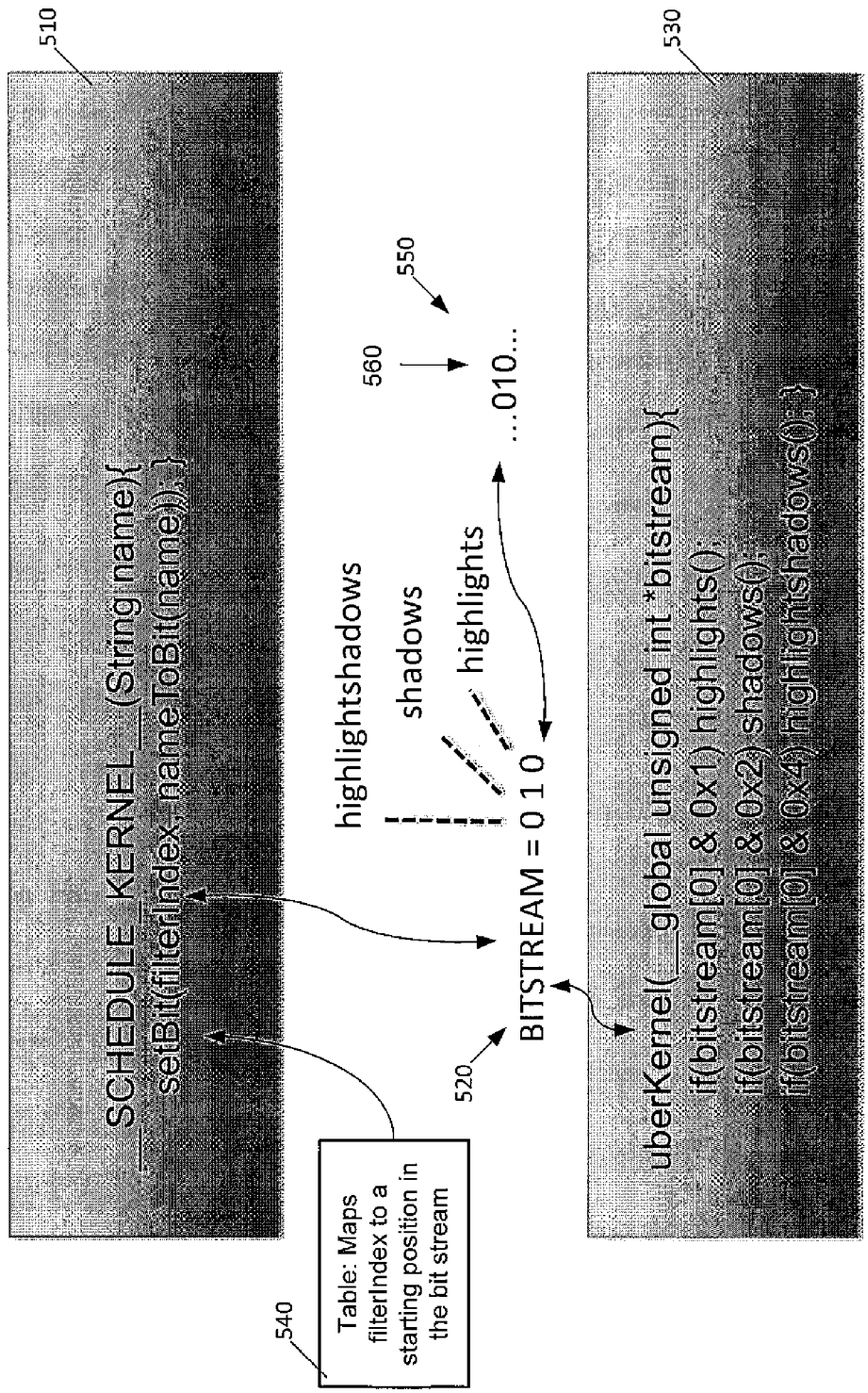
FIG. 5 shows exemplary mechanisms of another exemplary embodiment using a bit stream to represent conditional information.

More specifically, FIG. 5 shows exemplary mechanisms of another exemplary embodiment using a bit stream to represent conditional information. During RenderGraph execution, each call to filter::execute( ) makes some number of calls to _Schedule_Kernel_(name). See block 510. This function sets a bit in the bit stream 520 by calling setBit(filterIndex, nameToBit(name)). The function setBit consults a table 540 that was produced by the RenderGraph compiler 430 to map filterIndex to a starting position in the bit stream 520. The variable filterIndex is itself an index to filters in the code 440. The index could be determined by setting an index to zero for the first filter in code 440, setting the index to one for the second filter in code 440, and the like. The function nameToBit returns a bit position based on the name. In this example, in terms of bit positions relative to the starting bit position, "highlights" corresponds to position 0, "shadows" corresponds to position 1, and "highlightshadows" corresponds to position 2. The function setBit sets the bit at the appropriate location in the bit stream 520. In this example, the bit positions (and values) are 1 for highlights, 2 for shadows, and 4 for highlightshadows. Block 530 illustrates that the uberKernel contains conditional code that examines the bit stream 520 to make control flow decisions. The control flow decisions are as follows: If the bit stream has a value of 1, highlights( ) is to be executed; if the bit stream has a value of 2, shadows( ) is to be executed; and if the bit stream has a value of 4, highlightshadows( ) is to be executed.

Although the single filter of Highlight Shadow 420 is being illustrated in FIG. 5, there could be multiple filters of which Highlight Shadow 420 is only one. Thus, the bit stream 520 may be part of a larger bit stream 550 such that the starting bit position 560 could be non-zero. For instance, the starting bit position could be five, and the setBit sets bits relative to that starting location. The uberKernel conditional code in block 530 also would be modified to address additional filters.

Figure 6:
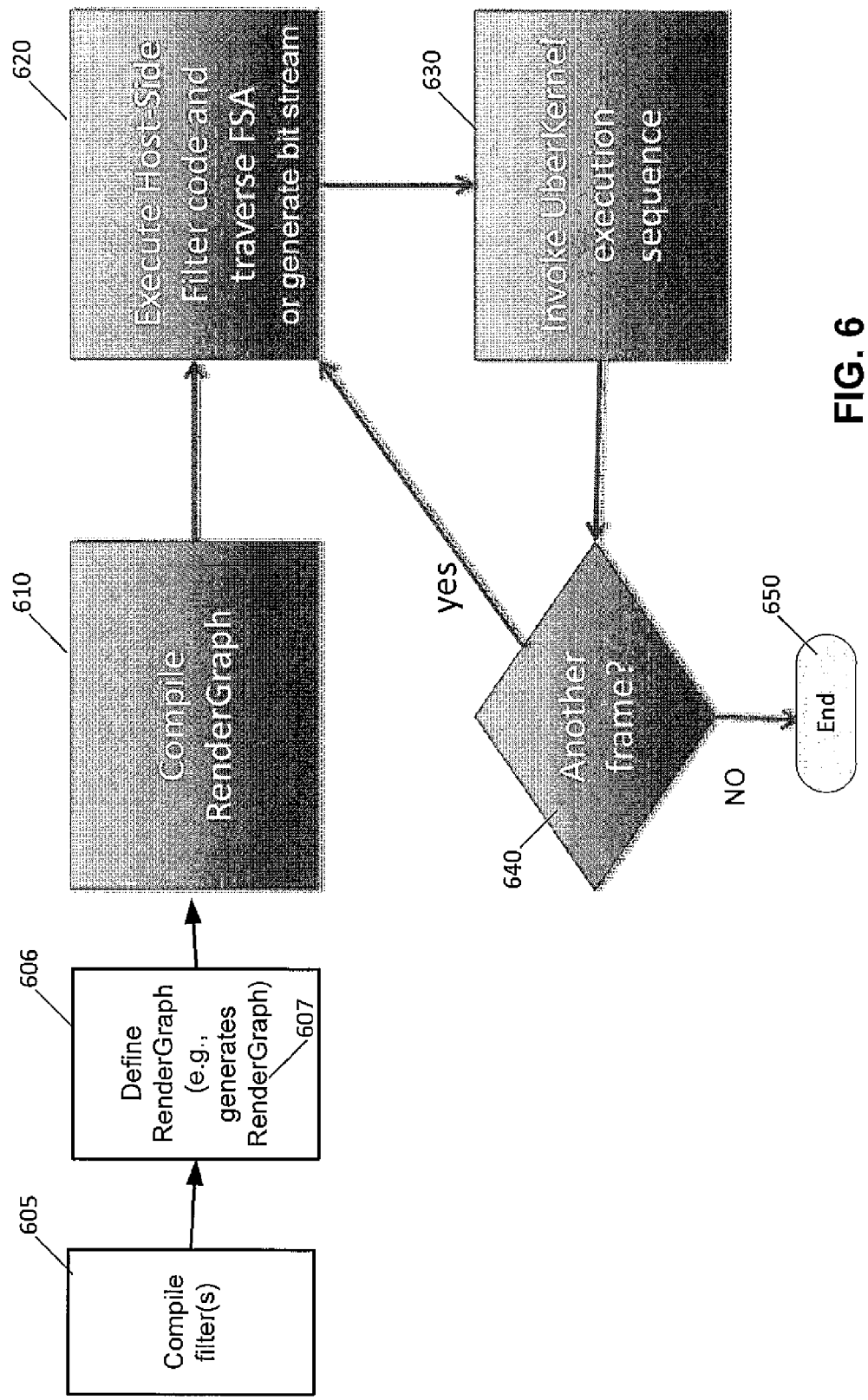
FIG. 6 is a logic flow diagram for a RenderGraph compilation method and use thereof for low-latency execution, and illustrates the operation of an exemplary method, a result of execution of computer program instructions embodied on a computer readable memory, functions performed by logic implemented in hardware, and/or interconnected means for performing functions in accordance with exemplary embodiments.

FIG. 6 shows a flowchart of events beginning with filter compilation and continuing through RenderGraph definition, compilation, and repeated frame executions. This figure is a logic flow diagram for a RenderGraph compilation method and use thereof for low-latency execution. This figure also illustrates the operation of an exemplary method, a result of execution of computer program instructions embodied on a computer readable memory, functions performed by logic implemented in hardware, and/or interconnected means for performing functions in accordance with exemplary embodiments. The blocks in the figure may be considered to be interconnected means for performing the functions in the blocks. The blocks are performed by a computer system such as a UE 110, e.g., under control at least in part of the image framework 136.

Each frame invocation includes host side execution with FSA traversal or bit stream generation followed by uberKernel invocation. In particular, a developer causes the filter(s) to be compiled (block 605), then the developer invokes code to cause the RenderGraph to be defined and compiled, which is illustrated in blocks 606 as "define RenderGraph" and 610 as "Compile RenderGraph". Block 606 generates a RenderGraph 607, which is a graph that defines a data flow from one or more inputs to one or more outputs for images. Next the RenderGraph executes for one or more frames. During this the host side filter code 440 executes and the image framework 136 traverses the FSA (block 620) or generates the bit stream (block 620) for a corresponding filter in the executing filter code.

When the FSA reaches an accepting state, the FSA invokes (block 630) the uberKernel with the identified execution sequence 490. Alternatively, the generated bit stream (or a portion but not all thereof) is passed to the uberKernel. If there is another frame (block 640=Yes), execution continues in block 620. If there is no other frame (block 640=No), the method ends in block 650.

Figure 7:
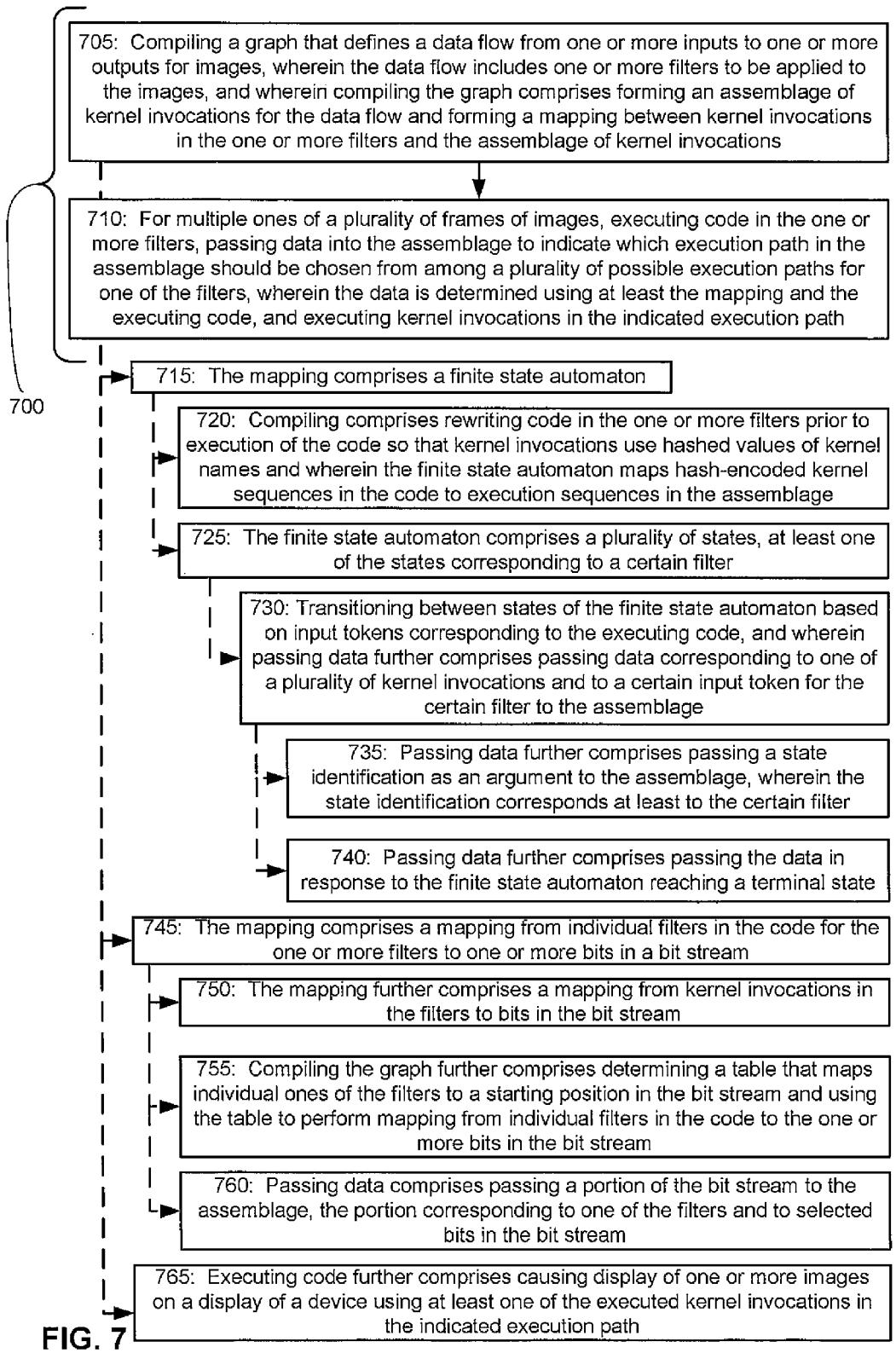
FIG. 7 is another logic flow diagram for a RenderGraph compilation method and use thereof for low-latency execution, and illustrates the operation of an exemplary method, a result of execution of computer program instructions embodied on a computer readable memory, functions performed by logic implemented in hardware, and/or interconnected means for performing functions in accordance with exemplary embodiments.

Turning to FIG. 7, another logic flow diagram is shown for a RenderGraph compilation method and use thereof for low-latency execution. This figure illustrates the operation of an exemplary method, a result of execution of computer program instructions embodied on a computer readable memory, functions performed by logic implemented in hardware, and/or interconnected means for performing functions in accordance with exemplary embodiments. The blocks in this figure may be considered to be interconnected means for performing the functions in the blocks.

Method 700 includes blocks 705 and 710 and blocks 715-765 are possible further exemplary embodiments of method 700. The method 700 may be performed by a user equipment 110, e.g., under control at least in part by the image framework 136. In block 705, the user equipment 110 performs the operation of compiling a graph 607 that defines a data flow from one or more inputs to one or more outputs for images. The data flow includes one or more filters 320, 420 to be applied to the images. Compiling the graph comprises forming an assemblage of kernel invocations (e.g., 470-3, 470-4, 470-5) for the data flow and forming a mapping (e.g., 450, 520) between kernel invocations in code 440 for the one or more filters 320, 420 and the assemblage of kernel invocations. The operation of compiling may be performed by a means for compiling.

In block 710, the user equipment 110, for multiple ones of a plurality of frames of images, performs the operation of executing code in the one or more filters, and passing data into the assemblage to indicate which execution path in the assemblage should be chosen from among a plurality of possible execution paths for one of the filters. The data is determined using at least the mapping and the executing code. Block 710 also includes executing kernel invocations in the indicated execution path. The executing code may be performed by a means for executing code and the passing data may be performed by a means for passing data.

Block 715 illustrates another possible exemplary embodiment, where the mapping comprises a finite state automaton 450. Blocks 720 and 725 are possible examples of block 715. In block 720, the compiling comprises rewriting code in the one or more filters prior to execution of the code 440 so that kernel invocations use hashed values of kernel names. Also, the finite state automaton 450 maps hash-encoded kernel sequences in the code 440 to execution sequences in the assemblage. In block 725, the finite state automaton comprises a plurality of states, at least one of the states corresponds to a certain filter. Block 730 is a further example of block 725, and in block 730, the user equipment performs transitioning between states of the finite state automaton based on input tokens corresponding to the executing code. Also, passing data further comprises passing data corresponding to one of a plurality of kernel invocations and to a certain input token for the certain filter to the assemblage. Blocks 735 and 740 are examples of block 730. In block 735, passing data further comprises passing a state identification as an argument to the assemblage (e.g., see block 495 of FIG. 4D), wherein the state identification corresponds at least to the certain filter. In block 740, passing data further comprises passing the data in response to the finite state automaton reaching a terminal state (e.g., 410-3, 410-5, 410-7), see blocks 480, 485 of FIG. 4D.

Block 745 is another example of method 700, where the mapping comprises a mapping from individual filters in the code for the one or more filters to one or more bits in a bit stream (e.g., 520 or 560). Blocks 750, 755, and 760 are examples of block 745. In block 750, the mapping further comprises a mapping from kernel invocations in the filters to bits in the bit stream. In block 755, compiling the graph further comprises determining a table 540 that maps individual ones of the filters to a starting position (e.g., 560) in the bit stream and using the table to perform mapping from individual filters in the code to the one or more bits in the bit stream. In block 760, passing data comprises passing a portion (e.g., 520) of the bit stream (e.g., 560) to the assemblage, the portion corresponding to one of the filters and to selected bits in the bit stream.

In block 765, executing code further comprises causing display of one or more images on a display (e.g., 20) of a device (e.g., user equipment 110) using at least one of the executed kernel invocations in the indicated execution path. Block 765 may apply to any of the blocks of method 700 and blocks 715 through 760.

An apparatus may include means for performing any of the methods of blocks 705-765. A communication system may include this apparatus. Another apparatus may include one or more processors and one or more memories including computer program code. The one or more memories and the computer program code are configured to, with the one or more processors, cause the apparatus to perform any of the methods of blocks 705-765.

4. Exemplary Advantages

The exemplary embodiments can eliminate all execution-time overhead of selecting and generating the uberKernel at each frame, in exchange for a small cost to traverse the FSA in most cases. As a result, applications that use the imaging framework 136 can execute nearly as efficiently as if they were written and optimized manually. Thus one technical effect is a speed improvement over conventional techniques.

The cost of this improvement is twofold. First, there is a longer compilation step for the RenderGraph, but since this only occurs once during the run of an application, this is not a serious problem.

Second, there is an increase in the size of the code of the uberKernel. The extent of this increase is partly determined by whether kernel code uses inline functions or function calls. This implies that the effect can be mitigated at the expense of some performance, by making function calls rather than using inline functions.

This increase is also determined by the complexity of the control flow of the part of the image processing filter that runs on the host. In practice, this complexity can be restricted without impacting the ability to write real time image processing filters, and as a result this problem can be kept manageable. For instance, one can require that each kernel invocation be executed no more than once per filter execution without limiting the useful domain of filters that can be written. This allows the RenderGraph compiler to correctly analyze the possible runtime execution sequences for the uberKernel. As another example, one can also allow the developer to specify that every kernel invocation is executed exactly once per filter execution. This makes the problem even simpler and results in a single execution sequence for many RenderGraphs.

In summary, for most applications requiring real time image processing functions the increase in code size will be reasonable, but for some applications with extreme characteristics the code size might be unacceptable.

While described above in reference to processors, these components may generally be seen to correspond to one or more processors, data processors, processing devices, processing components, processing blocks, circuits, circuit devices, circuit components, circuit blocks, integrated circuits and/or chips (e.g., chips comprising one or more circuits or integrated circuits).

The various controllers/data processors, memories, programs, transceivers and antenna arrays depicted in FIGS. 1 and 2 may all be considered to represent means for performing operations and functions that implement the several non-limiting aspects and embodiments of this invention.

Without in any way limiting the scope, interpretation, or application of the claims appearing below, a technical effect of one or more of the example embodiments disclosed herein is to improve a speed at which images may be rendered on a computer. Another technical effect of one or more of the example embodiments disclosed herein is lower latency operation for image rendering.

Embodiments of the present invention may be implemented in software or hardware or a combination of software and hardware. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIGS. 1 and 2. A computer-readable medium may comprise a computer-readable storage medium that may be any media or means that can contain or store the instructions for use by or in connection with an instruction execution system, apparatus, or device, such as a computer, but the computer-readable storage medium does not encompass propagating signals.

If desired, the different functions discussed herein may be performed in a different order and/or concurrently with each other. Furthermore, if desired, one or more of the above-described functions may be optional or may be combined.

Although various embodiments of the invention are set out in the independent claims, other examples of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method, comprising:
   compiling a render graph that defines a data flow from one or more inputs to one or more outputs for images, wherein the data flow includes one or more filters to be applied to the images, and
   wherein compiling the render graph comprises:
      forming an assemblage of kernel invocations for the data flow and
      forming a mapping between kernel invocations in code for the one or more filters and the assemblage of kernel invocations; and
      for multiple ones of a plurality of frames of images, rewriting code in the one or more filters prior to execution of the code so that kernel invocations use hashed values of kernel names and wherein a finite state automaton maps hash-encoded kernel sequences in the code to execution sequences in the assemblage,
      executing code in the one or more filters,
      passing data into the assemblage to indicate which execution path in the assemblage should be chosen from among a plurality of possible execution paths for one of the filters, wherein the data is determined using at least the mapping and the executing code, and
   executing kernel invocations in the indicated execution path.

2. The method of claim 1, wherein the finite state automaton comprises a plurality of states, at least one of the states corresponding to a certain filter.

3. The method of claim 1, wherein the mapping comprises a mapping from individual filters in the code for the one or more filters to one or more bits in a bit stream.

4. The method of claim 3, wherein the mapping further comprises a mapping from kernel invocations in the filters to bits in the bit stream.

5. The method of claim 1, wherein executing code further comprises causing display of one or more images on a display of a device using at least one of the executed kernel invocations in the indicated execution path.

6. An apparatus, comprising:
   one or more processors; and
   one or more memories including computer program code, the one or more memories and the computer program code configured, with the one or more processors, to cause the apparatus to perform at least the following:
      compiling a render graph that defines a data flow from one or more inputs to one or more outputs for images, wherein the data flow includes one or more filters to be applied to the images, and wherein compiling the render graph comprises:
         forming an assemblage of kernel invocations for the data flow and
         forming a mapping between kernel invocations in code for the one or more filters and the assemblage of kernel invocations; and
         for multiple ones of a plurality of frames of images, rewriting code in the one or more filters prior to execution of the code so that kernel invocations use hashed values of kernel names and wherein a finite state automaton maps hash-encoded kernel sequences in the code to execution sequences in the assemblage,
         executing code in the one or more filters,
         passing data into the assemblage to indicate which execution path in the assemblage should be chosen from among a plurality of possible execution paths for one of the filters, wherein the data is determined using at least the mapping and the executing code, and
         executing kernel invocations in the indicated execution path.

7. The apparatus of claim 6, wherein the finite state automaton comprises a plurality of states, at least one of the states corresponding to a certain filter.

8. The apparatus of claim 7, wherein the one or more memories and the computer program code are further configured, with the one or more processors, to cause the apparatus to perform at least transitioning between states of the finite state automaton based on input tokens corresponding to the executing code, and wherein passing data further comprises passing data corresponding to one of a plurality of kernel invocations and to a certain input token for the certain filter to the assemblage.

9. The apparatus of claim 8, wherein passing data further comprises passing a state identification as an argument to the assemblage, wherein the state identification corresponds at least to the certain filter.

10. The apparatus of claim 8, wherein passing data further comprises passing the data in response to the finite state automaton reaching a terminal state.

11. The apparatus of claim 6, wherein the mapping comprises a mapping from individual filters in the code for the one or more filters to one or more bits in a bit stream.

12. The apparatus of claim 11, wherein the mapping further comprises a mapping from kernel invocations in the filters to bits in the bit stream.

13. The apparatus of claim 11, wherein compiling the graph further comprises determining a table that maps individual ones of the filters to a starting position in the bit stream and using the table to perform mapping from individual filters in the code to the one or more bits in the bit stream.

14. The apparatus of claim 11, wherein passing data comprises passing a portion of the bit stream to the assemblage, the portion corresponding to one of the filters and to selected bits in the bit stream.

15. The apparatus of claim 6, wherein the apparatus comprises a display and executing code further comprises causing display of one or more images on the display of a device using at least one of the executed kernel invocations in the indicated execution path.

16. A computer program product comprising a non-transitory computer-readable storage medium bearing computer program code embodied therein for use with a computer, and executed by a processor; the computer program code comprising:
   code for compiling a render graph that defines a data flow from one or more inputs to one or more outputs for images, wherein the data flow includes one or more filters to be applied to the images, and wherein compiling the render graph comprises:

forming an assemblage of kernel invocations for the data flow and forming a mapping between kernel invocations in code for the one or more filters and the assemblage of kernel invocations; and code, for multiple ones of a plurality of frames of images, rewriting code in the one or more filters prior to execution of the code so that kernel invocations use hashed values of kernel names and wherein a finite state automaton maps hash-encoded kernel sequences in the code to execution sequences in the assemblage, for executing code in the one or more filters, for passing data into the assemblage to indicate which execution path in the assemblage should be chosen from among a plurality of possible execution paths for one of the filters, wherein the data is determined using at least the mapping and the executing code, and for executing kernel invocations in the indicated execution path.

\* \* \* \* \*